(12) United States Patent
Dietz et al.

(10) Patent No.: US 10,955,924 B2
(45) Date of Patent: Mar. 23, 2021

(54) INDIVIDUALLY INTERACTIVE MULTI-VIEW DISPLAY SYSTEM AND METHODS THEREFOR

(71) Applicant: Misapplied Sciences, Inc., Redmond, WA (US)

(72) Inventors: Paul Henry Dietz, Redmond, WA (US); Albert Han Ng, Redmond, WA (US); David Steven Thompson, Redmond, WA (US)

(73) Assignee: Misapplied Sciences, Inc., Redmond, WA (US)

( * ) Notice: Subject to any disclaimer, the term of this patent is extended or adjusted under 35 U.S.C. 154(b) by 679 days.

(21) Appl. No.: 15/002,164

(22) Filed: Jan. 20, 2016

(65) Prior Publication Data
US 2016/0224122 A1 Aug. 4, 2016

Related U.S. Application Data

(60) Provisional application No. 62/109,570, filed on Jan. 29, 2015.

(51) Int. Cl.
*G06F 3/01* (2006.01)
*G06F 9/451* (2018.01)
(Continued)

(52) U.S. Cl.
CPC .............. *G06F 3/017* (2013.01); *G06F 3/147* (2013.01); *G06F 9/451* (2018.02); *G06F 9/453* (2018.02);
(Continued)

(58) Field of Classification Search
CPC .......... H04N 13/0475; H04N 13/0477; H04N 13/0479; H04N 13/0481; H04N 13/0464;
(Continued)

(56) References Cited

U.S. PATENT DOCUMENTS

| 5,855,425 A | 1/1999 | Hamagishi |
| 6,339,421 B1 | 1/2002 | Puckeridge |

(Continued)

FOREIGN PATENT DOCUMENTS

| EP | 2685735 A1 | 1/2014 |
| WO | 0224470 A | 3/2002 |
| WO | 2013183108 A1 | 12/2013 |

OTHER PUBLICATIONS

"Non-Final Office Action" dated Jan. 31, 2017, Issued in U.S. Appl. No. 15/180,341.
(Continued)

*Primary Examiner* — Amr A Awad
*Assistant Examiner* — Aaron Midkiff
(74) *Attorney, Agent, or Firm* — Kaplan Breyer Schwarz, LLP

(57) ABSTRACT

A multi-view display system that enables viewers to individually interact with the system to provide information thereto is disclosed. The system includes a multi-view display, a system controller, and an input/communications device. In the illustrative embodiment, the input/communications device provides a way for a viewer to communicate, to the system, a viewing preference pertaining to the presentation of content and facilitates associating the viewing preference with a viewing location so that the content that is ultimately displayed via the multi-view display is viewable by viewer at the proper viewing location.

25 Claims, 8 Drawing Sheets

(51) Int. Cl.
*G06F 3/147* (2006.01)
*H04N 13/398* (2018.01)
*H04N 13/30* (2018.01)

(52) U.S. Cl.
CPC ... *H04N 13/398* (2018.05); *G09G 2320/0261* (2013.01); *H04N 2013/403* (2018.05)

(58) Field of Classification Search
CPC .......... H04N 13/047; H04N 2013/0461–0465; H04N 13/398; H04N 2013/403; G06F 3/017; G06F 3/147; G06F 9/451; G06F 9/453; G06F 21/00–88; G09G 5/12; G09G 2320/0261
USPC .......................................... 345/156; 715/863
See application file for complete search history.

(56) References Cited

U.S. PATENT DOCUMENTS

| | | | |
|---|---|---|---|
| 6,377,295 | B1 | 4/2002 | Woodgate et al. |
| 7,001,023 | B2 | 2/2006 | Lee et al. |
| 7,602,395 | B1 | 10/2009 | Diard |
| 7,990,498 | B2 | 8/2011 | Hong |
| 8,461,995 | B1 | 6/2013 | Thornton |
| 9,080,279 | B2 | 7/2015 | Jun et al. |
| 9,715,827 | B2 | 7/2017 | Ng et al. |
| 9,743,500 | B2 | 8/2017 | Dietz et al. |
| 9,792,712 | B2 | 10/2017 | Ng et al. |
| 2003/0115096 | A1 | 6/2003 | Reynolds et al. |
| 2003/0156260 | A1 | 8/2003 | Putilin et al. |
| 2005/0195330 | A1 | 9/2005 | Zacks et al. |
| 2007/0040892 | A1 | 2/2007 | Aoki et al. |
| 2009/0273486 | A1 | 11/2009 | Sitbon |
| 2010/0085517 | A1 | 4/2010 | Hong |
| 2010/0207961 | A1 | 8/2010 | Zomet |
| 2010/0214537 | A1 | 8/2010 | Thomas |
| 2011/0159929 | A1 | 6/2011 | Karaoguz et al. |
| 2011/0216171 | A1 | 9/2011 | Barre et al. |
| 2011/0242298 | A1 | 10/2011 | Bathiche et al. |
| 2011/0304613 | A1* | 12/2011 | Thoresson ......... H04N 13/0402 345/419 |
| 2012/0026157 | A1 | 2/2012 | Unkel et al. |
| 2012/0062565 | A1 | 3/2012 | Fuchs et al. |
| 2012/0105445 | A1 | 5/2012 | Sakai et al. |
| 2012/0140048 | A1 | 6/2012 | Levine |
| 2012/0218253 | A1 | 8/2012 | Clavin |
| 2013/0093752 | A1 | 4/2013 | Yuan |
| 2013/0114019 | A1 | 5/2013 | Ijzerman et al. |
| 2013/0169765 | A1* | 7/2013 | Park ...................... H04N 13/04 348/54 |
| 2013/0321599 | A1 | 12/2013 | Harrold et al. |
| 2014/0015829 | A1 | 1/2014 | Park et al. |
| 2014/0035877 | A1* | 2/2014 | Cai ...................... H04H 60/33 345/175 |
| 2014/0111101 | A1 | 4/2014 | McRae |
| 2015/0020135 | A1* | 1/2015 | Frusina .............. H04N 21/4621 725/116 |
| 2015/0042771 | A1 | 2/2015 | Jensen et al. |
| 2015/0049176 | A1 | 2/2015 | Hinnen et al. |
| 2015/0062314 | A1 | 3/2015 | Itoh |
| 2015/0085091 | A1 | 3/2015 | Varekamp |
| 2015/0092026 | A1 | 4/2015 | Baik et al. |
| 2015/0154394 | A1 | 6/2015 | Kapinos et al. |
| 2015/0198940 | A1 | 7/2015 | Hwang et al. |
| 2015/0279321 | A1 | 10/2015 | Falconer et al. |
| 2015/0334807 | A1 | 11/2015 | Gordin et al. |
| 2015/0365422 | A1 | 12/2015 | Peterson et al. |
| 2016/0012726 | A1 | 1/2016 | Wang |
| 2016/0210100 | A1 | 7/2016 | Ng et al. |
| 2016/0212417 | A1 | 7/2016 | Ng et al. |
| 2016/0224122 | A1 | 8/2016 | Dietz et al. |
| 2016/0227200 | A1 | 8/2016 | Reitterer et al. |
| 2016/0227201 | A1 | 8/2016 | Ng et al. |
| 2016/0261837 | A1 | 9/2016 | Thompson et al. |
| 2016/0261856 | A1 | 9/2016 | Ng et al. |
| 2016/0293003 | A1 | 10/2016 | Ng et al. |
| 2016/0341375 | A1 | 11/2016 | Baker |
| 2016/0341377 | A1 | 11/2016 | Eddins |
| 2016/0366749 | A1 | 12/2016 | Dietz et al. |
| 2016/0371866 | A1 | 12/2016 | Ng et al. |
| 2017/0205889 | A1 | 7/2017 | Ng et al. |

OTHER PUBLICATIONS

Authorized Officer: Jacinta Molloy, "International Search Report and Written Opinion" dated Sep. 29, 2016 issued in PCT Application No. PCT/US2016/037185.
"Office Action" dated Oct. 6, 2016 issued in U.S. Appl. No. 15/060,527.
Officer: Patricia Stein, "International Search Report and Written Opinion", dated Jun. 3, 2016, issued in related PCT Application: PCT/US2016/04122.
"Non-Final Office Action", U.S. Appl. No. 15/002,158, dated Mar. 3, 2017, p. 19.
"Notice of Allowance and Fees Due", U.S. Appl. No. 15/180,341, dated Jul. 11, 2017, 7 pp.
Authorized Officer: Mehrdad Dastouri, "International Preliminary Report on Patentability" dated Feb. 3, 2017 issued in PCT International Application PCT/US16/14122, 21 pp.
Officer: Jeffrey Harold, "International Preliminary Report on Patentability", Completed Mar. 20, 2017, Issued in International Patent Application PCT/US2016/020784, 6 pp.
"Notice of Allowance", Issued in U.S. Appl. No. 15/184,874, dated Sep. 8, 2017, 14 pp.
"Non-Final Office Action", U.S. Appl. No. 15/002,014, dated Oct. 27, 2017, 11 pp.
"Final Office Action", U.S. Appl. No. 15/002,175, dated Nov. 2, 2017, 21 pp.
"Final Office Action", U.S. Appl. No. 15/015,099, dated Nov. 13, 2017, 14 pp.
"Advisory Action" received for U.S. Appl. No. 15/002,175, dated Jun. 21, 2018, 3 pages.
Officer: Patricia Stein, "International Search Report and Written Opinion", dated May 12, 2016, issued in related PCT Application: PCT/US2016/020784.
"Non-Final Office Action" in U.S. Appl. No. 15/062,103 dated Feb. 14, 2018.
"Non-Final Office Action" dated Feb. 8, 2018 in U.S. Appl. No. 15/060,527.
"Non Final Office Action" dated Apr. 4, 2018 in U.S. Appl. No. 15/002,158, p. 23.
"Non-Final Office Action", U.S. Appl. No. 15/060,527, dated May 19, 2017, 13 pp.
"Non-Final Office Action", Related U.S. Appl. No. 15/184,874, dated May 22, 2017, 19 pp.
"Non-Final Office Action", Related U.S. Appl. No. 15/015,099, dated May 4, 2017, 9 pp.
"Non-Final Office Action", dated Mar. 24, 2017, Issued in related U.S. Appl. No. 15/002,175, 26 pp.
"Non-Final Office Action", dated Jan. 26, 2017, issued in U.S. Appl. No. 15/088,912.
Non-Final Office Action received for U.S. Appl. No. 15/062,103 dated Oct. 11, 2018, 9 pages.
Non-Final Office Action received for U.S. Appl. No. 15/015,099 dated Oct. 12, 2018, 6 pages.
Final Office Action received for U.S. Appl. No. 15/060,527 dated Oct. 5, 2018, 14 pages.
Final Office Action received for U.S. Appl. No. 15/002,158 dated Oct. 5, 2018, 22 pages.
Notice of Allowance and Fees Due (PTOL-85) received for U.S. Appl. No. 15/060,527, dated Mar. 14, 2019, 8 pages.
Notice of Allowance and Fees Due (PTOL-85) received for U.S. Appl. No. 15/015,099, dated Dec. 18, 2018, 5 pages.
Non-Final Rejection received for U.S. Appl. No. 15/002,014, dated Jan. 15, 2019, 18 pages.
Final Rejection received for U.S. Appl. No. 15/944,366, dated Nov. 14, 2018, 26 pages.

(56) References Cited

OTHER PUBLICATIONS

Examiner initiated interview summary (PTOL-413B) received for U.S. Appl. No. 15/060,527, dated Jan. 30, 2019, 2 pages.
Advisory Action (PTOL-303) received for U.S. Appl. No. 15/944,366, dated Feb. 20, 2019, 3 pages.
Advisory Action (PTOL-303) received for U.S. Appl. No. 15/060,527 , dated Jan. 30, 2019, 3 pages.
Advisory Action (PTOL-303) received for U.S. Appl. No. 15/002,158, dated Dec. 20, 2018, 4 pages.

* cited by examiner

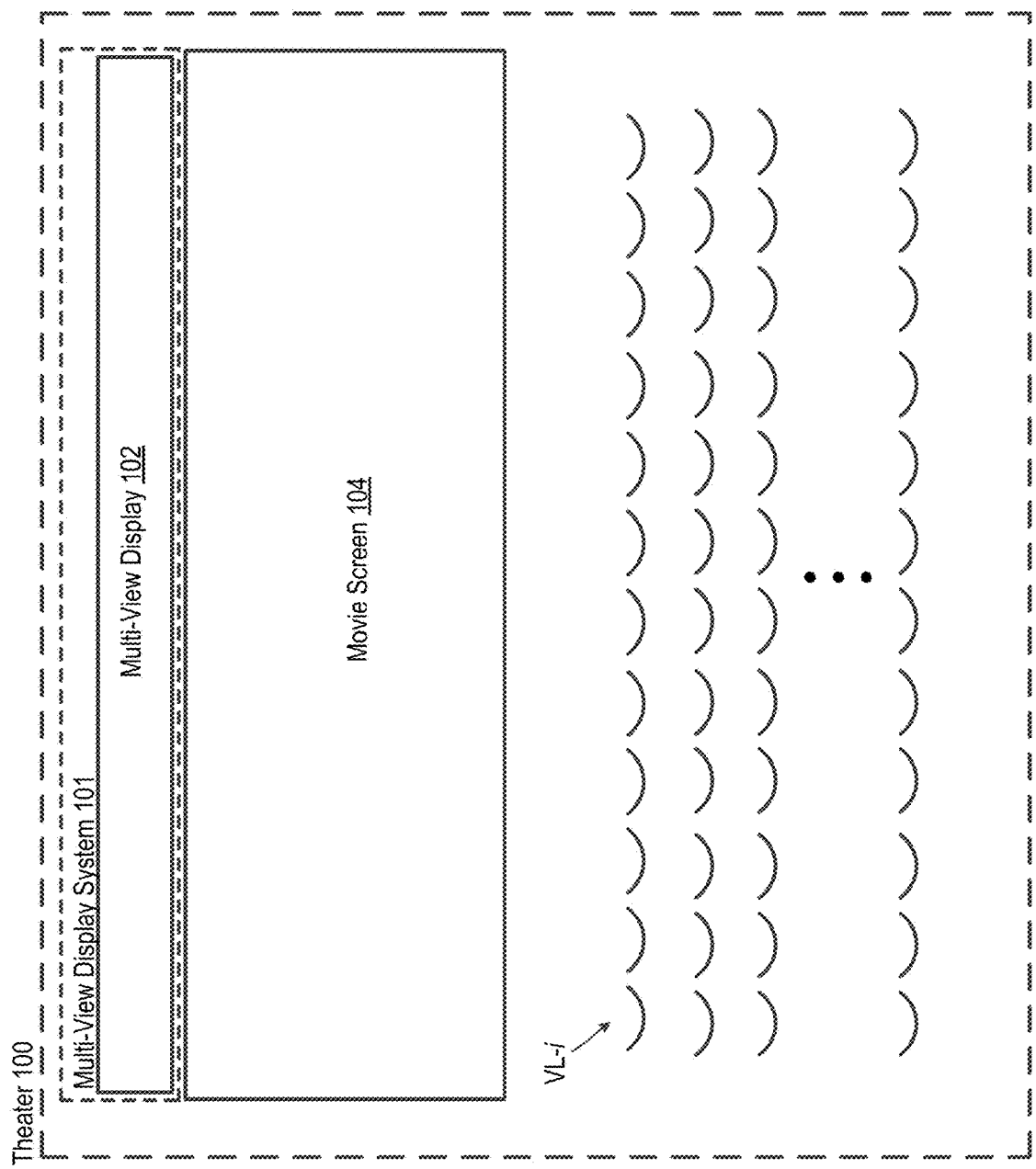

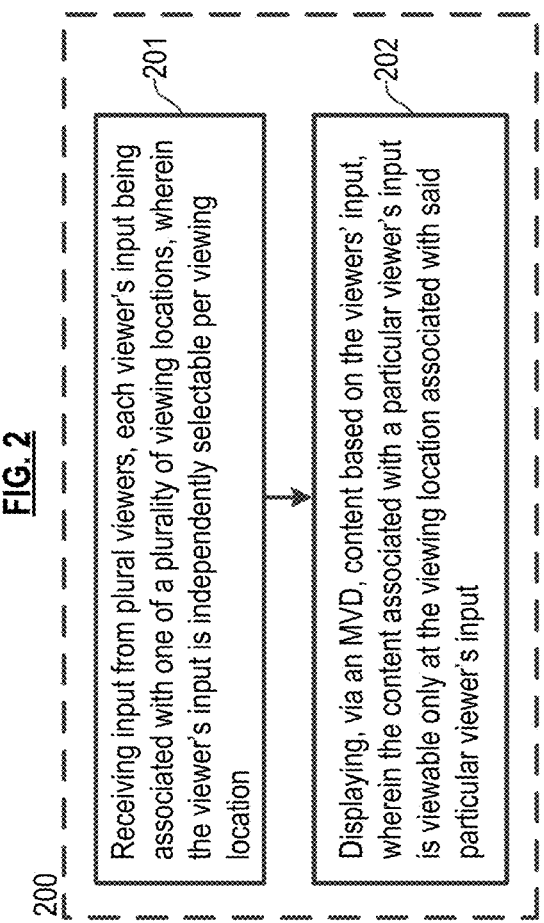
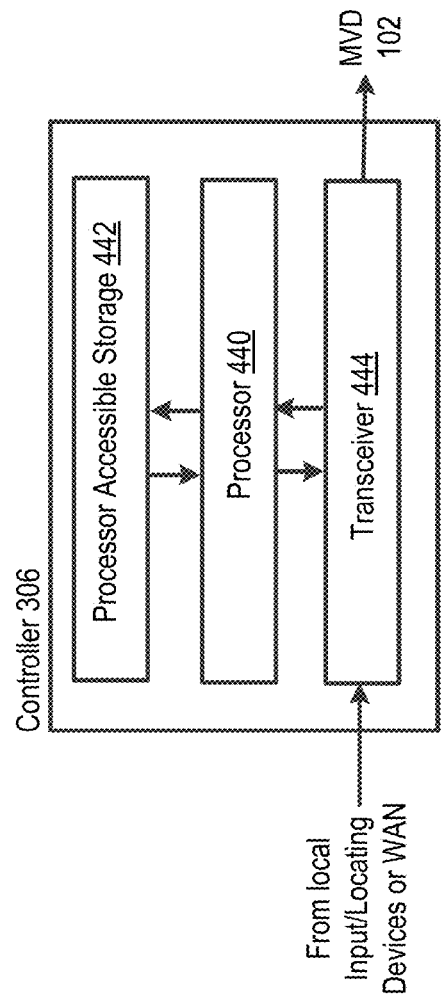

INDIVIDUALLY INTERACTIVE MULTI-VIEW DISPLAY SYSTEM AND METHODS THEREFOR

STATEMENT OF RELATED CASES

This case claims priority of U.S. Patent Application Ser. No. 62/109,570 filed Jan. 29, 2015 and is incorporated herein by reference. This case is also related to the following U.S. patent applications, all of which were filed on even date herewith and all of which are incorporated by reference. To the extent there are any inconsistencies between the language used in this disclosure and the language used in Ser. No. 62/109,570 or the cases listed below, the language used in this disclosure controls:

"Method for Calibrating a Multi-view Display" Ser. No. 15/002,014;
"Differentiated Content Delivery System and Method Therefor" Ser. No. 15/002,158); and
"Individually Interactive Multi-View Display System For Non-Stationary Viewing Locations and Methods Therefor" Ser. No. 15/002,175.

FIELD OF THE INVENTION

This disclosure pertains to multi-view displays.

BACKGROUND OF THE INVENTION

A multi-view display (MVD) can simultaneously present a different image to each one of plural viewers that are at different viewing locations with respect to the MVD. For example, Sharp Corporation and Microsoft Corporation have developed displays that are capable of showing a small number of independent views based on the viewer's angle with respect to the display. Viewers can interact with these displays using standard control devices. For example, there might be separate game controllers for a left view and a right view.

Advances in technology are expected to result in next-generation MVDs that would enable hundreds to thousands of people to simultaneously view a single display yet each see something different. These devices will operate by controlling the images presented at different viewing locations, each of which locations having a unique viewing angle with respect to each pixel in the MVD.

The ability to present, on a single viewing screen, different images to different viewers based on their viewing location presents interesting possibilities.

SUMMARY OF THE INVENTION

A multi-view display (MVD) possesses the ability to present, on a single viewing screen, different images to different viewers based on a difference in each viewer's viewing location. The inventors recognized that this unique ability of an MVD could be leveraged to great benefit if each viewer could individually interact they system. Based on that recognition, the inventors sought to develop systems and methods by which individual interactions can be associated with each viewpoint (i.e., viewing location or viewer) to thereby enable simultaneous, mass, personalized interaction with an MVD.

The present invention provides a way for viewers to individually interact with an MVD system, such as, for example, to communicate viewing preferences.

Methods in accordance with the present teachings uniquely associate a viewer of an MVD with a particular viewing location. Based on the association, a viewer is able to: (1) provide input to the MVD system and (2) view updated content that represents the system's response to the viewer's input, as displayed via the MVD, at the particular viewing location.

The present invention can be used in a variety of contexts, such as captioning, gaming, and advertising, to name but a few. In the illustrative embodiment, an individually interactive MVD system is used for captioning.

Captioning typically involves the presentation of text and/or graphics that correspond, in some manner, to the audio component of a presentation, such as a film, speech, or play, or provides other commentary, information, instruction, or explanation, or substitutes for audio as in a silent film. For the captioning embodiments, the viewer's input is a "viewing preference" pertaining to the content that they wish to view or to one or more attributes of such content. The updated content is the image that is displayed to the viewer in response to the selection.

For example, in the context of viewing a movie, a viewing preference might be "Director's commentary," the content being the commentary of the director. Or the viewing preference might be "Italian-language subtitles," with the content being the Italian-language text that is displayed in response to the preference. Or the viewing preference might be "display text in blue color." It is notable that the first two selections are selections of "content;" that is, the commentary of the Director (as opposed to that of one of the actors) and Italian language subtitles (as opposed to subtitles in some other language). The third selection, however, is more appropriately characterized as an example of preference pertaining to an attribute of content. That is, the text being displayed is the content, the attribute is the color of the text. The updated content is thus the blue text appearing on the MVD.

The illustrative embodiment, as presented herein, pertains to the use of an MVD system for captioning and methods for same. In the context of captioning, the association of a viewer with a unique viewing location enables the viewer to: (1) convey a viewing preference pertaining to content, or attributes thereof, that they wish to view and (2) view, at the associated viewing location, the content related to their viewing preference.

In embodiments of the invention, an affirmative action on the part of the viewer conveys information to the MVD system. In the illustrative embodiment, that information is interpreted, by appropriate software/hardware of the MVD system, as a viewer's viewing preference, as it applies to the presentation of content by the MVD. Such affirmative action—explicit direction on the part of the viewer—is to be contrasted with an approach, such as disclosed in U.S. patent application Ser. No. 15/002,158 entitled "Differentiated Content Delivery via a Multi-View Display System," wherein a viewer's "interest" in, or suitability for, any particular content is, in some embodiments, "inferred" from other information available to the MVD system.

In some embodiments, the viewer's affirmative action is to provide input—a viewing preference—via a user interface, such as can be generated by software running on a communications device (e.g., the viewer's smart phone, a device provided by the theater operator, etc.). In such embodiments, typical affirmative actions include, for example and without limitation, manipulating a joy-stick, keying (e.g., typing, etc.) or otherwise touching a touch-sensitive display, or issuing verbal commands. In some other embodiments, the affirmative action can be a gesture that is captured, for example, via a sensing system that is part of the MVD system. Such gestures are then interpreted by the MVD system as commands pertaining to viewing preferences. By way of illustration, but not limitation, the gestures can include left/right or other movements of the arm(s) or hand(s), and also include holding an optically sensed object (e.g., a card, a paddle, a wand, etc.).

In some embodiments, the optically sensed object has distinguishing features/characteristics (e.g., color, patterns, etc.) that can be used to convey information (e.g., viewing preference, etc.). In some further embodiments, the distinguishing characteristic can have a temporal component. For example, in some embodiments, the optically sensed object is an illuminated wand, which is manipulated by the viewer. The illumination is pulsed (i.e., the wand "flashes") to convey information, such as a viewing preference, to the MVD system. In addition, for example, to conveying information based on the pattern of the pulses, the rate of pulsation can be varied to the same effect.

In the illustrative embodiment, a system for practicing the invention includes a multi-view display, a system controller, and one or more "input/locating" device(s). The latter device(s) is something that, at least in part: (1) enables/facilitates communication between viewers and the MVD system (to enable viewer input of, for example, viewing preference) and (2) provides "location information" to the system controller and/or other elements of the MVD system. Location information means information pertaining to a viewing location; more specifically, to the particular viewing location, of the many available, at which a particular item of output (i.e., the updated content responsive to the viewing preference) is to be viewable. The system controller associates the viewing location with the input/locating device(s) or viewer so that when the MVD system receives, for example, a viewing preference therefrom, it is able to display the updated content to the correct viewing location. The correct viewing location being the one that is associated with the input/locating device(s) or viewer that transmits the viewing preference.

BRIEF DESCRIPTION OF THE DRAWINGS

FIG. 1 depicts a theater including a conventional movie screen and a multi-view display system in accordance with the present teachings.

FIG. 2 depicts a method for operating the multi-view display.

FIG. 4 depicts a block diagram of a controller.

DETAILED DESCRIPTION

Figure 3:
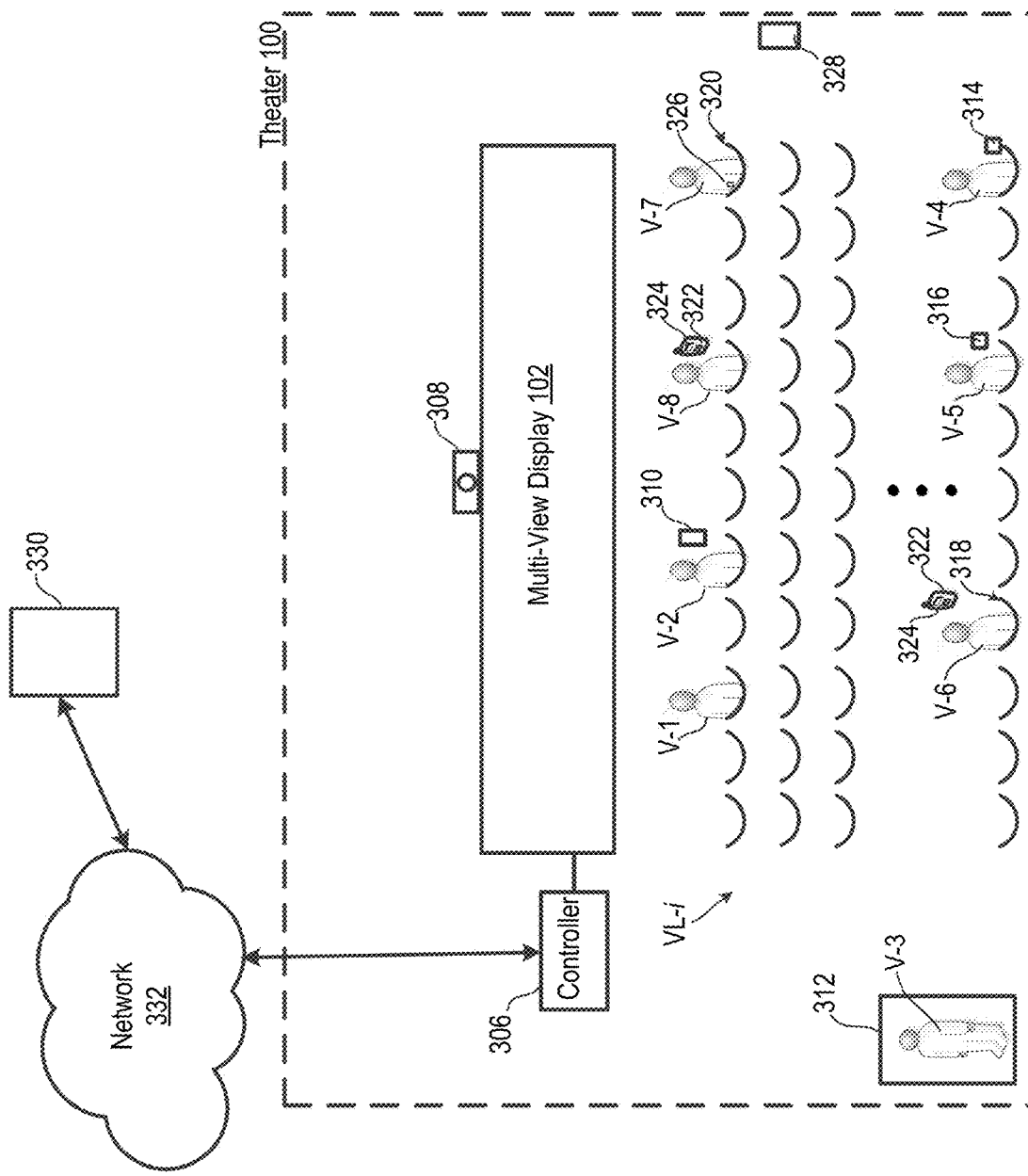
FIG. 3 depicts further details of the multi-view display system of FIG. 1.

The terms appearing below and inflected forms thereof are defined for use in this disclosure and the appended claims as follows:

"associating," when used in the context of a relationship between input/a viewing preference/a communications device/or a viewer and a particular viewing location, means that the input, etc., or communications from the communication device or viewer are intended to pertain to the particular viewing location. As a consequence, if the response of the MVD system is to display updated content for viewing, it is displayed for viewing at the viewing location that is associated with the input/viewing preference/communications device/viewer.

"content" means whatever is displayed by the MVD. In the context of a captioning embodiment, it is an updated image responsive to a viewing preference.

"viewing preference" means, in the context of a captioning embodiment, a viewer's preference as to the content that they wish to view or one or more attributes of such content.

"datum" means an item of information.

"location information" means information pertaining to a viewing location; more specifically, to the particular viewing location, of the many available, at which a particular item of output (i.e., the content responsive to viewer input) is to be viewable.

"multi-view display" or "MVD" means a display that is capable of simultaneously presenting a different image to each one of plural viewers that are at different viewing angles (locations) with respect to the MVD. The different images seen by each of such different viewers is displayed in the same location of the display.

Additional definitions may appear throughout the disclosure in context.

As previously indicated, the illustrative embodiment pertains to using the individually interactive MVD system in the context of captioning, such as in a movie theater. In other embodiments, the system and methods disclosed herein can be used for captioning in other environments, such as live performance theaters, stadiums, houses of worship, lecture halls, theme parks, schools, museums, etc. Those skilled in the art will know how to adapt the present teachings to captioning in such other environments.

In still further embodiments, the system and methods can be used in other applications other than captioning, such as gaming, advertising, directions, and information to name a few. For gaming embodiments, the viewer's input is typically a command to take some action in the game, such as directing an avatar's actions, etc. The updated content is the response of the game, such as a particular action of the avatar, a change of scenery, etc.

For advertising (retail or otherwise), the viewer's input is their interest in the goods or service being advertised. The viewer's interest can be manifested by, for example, their movement towards a product or handling the product. Such movement or handling is captured by an appropriate sensing system. The updated content, which is displayed via the MVD, is typically information related to the product. Those skilled in the art will know how to adapt the present teachings pertaining to movie-theater captioning, to applications such as gaming and retail advertising, among any others.

For directions, the viewer's input is, for example, a particular destination. In an environment such as large shopping mall or other complex of businesses, a plurality of MVDs can be positioned throughout the environment. The updated content, which is displayed via the MVD, might be a message to "turn right," "proceed 100 yards," etc. Such content would be updated, as appropriate, as the viewer reached each successive MVD en route to the destination. For information, the viewer's input is, for example, the information of interest.

FIG. 1 depicts theater 100 having a plurality of seats located at a plurality of viewing locations VL-i, i=1,n. Within theater 100 are conventional movie screen 104 and multi-view display (MVD) system 101. The MVD system includes MVD 102 as well as other electronics (not depicted in FIG. 1). MVD 102 is capable of displaying a different image to each different viewing location VL-i in theater 100 in known fashion.

The principle of operation of an MVD is known to those skilled in the art and so will be discussed only briefly. The salient difference between a traditional display, such as LCD, LED, plasma, or projection display and a multi-view display is that the former displays the same image to all viewers while the latter is able to display different images to different viewers simultaneously.

Some versions of a multi-view display include one or more projection elements that emit light of different color and brightness at different angles. The projection element includes a light source, an imager, and a lens. Examples of suitable imagers include, without limitation, digital micro-mirror devices, liquid crystals, light emitting diodes, and/or liquid crystal on silicon (LCOS). Each projection element can be considered to be a single pixel of the display, wherein a full graphic multi-view display is formed from an array of such projection elements. In some embodiments, each projection element—each pixel—is controlled by its own processor. In some other embodiments, a processor controls plural projection elements, but less than all of the elements of the display. In some embodiments, all of such processors in the display are connected via a network (e.g., Ethernet, Infiniband, $I^2C$, SPI, Wi-Fi, etc.), or, more generally, a communication channel (e.g., HDMI, etc.).

The light source illuminates the imager and the imager filters or directs the light through the lens. The lens is capable of directing light that is received from different locations of the imager in different directions. For example, a projector with resolution of 1920×1080 is capable of controllably directing light in over two million directions. The color and brightness emitted at each angle is different. Each element, from a viewer's perspective, appears to be a light source of the color and brightness of the light that is projected onto the viewer, even if the projection is too dim for any image to be visible on nearby surfaces. As a consequence, the appearance of each projection element from the perspective of a viewer is dependent upon the angle at which the viewer views the element.

As will be appreciated by those skilled in the art, the foregoing provides a description of one of a variety of different implementations of a multi-view display. Any implementation of an MVD known to those skilled may suitably be used. Furthermore, embodiments of an MVD as disclosed in applicant's co-pending application entitled "Calibrated Multi-View Display," may suitably be used in conjunction with embodiments of the present invention.

In accordance with some embodiments of the present invention, MVD system 101 is configured and operated to enable viewers to individually interact therewith to specify the content, or attributes thereof, that they wish to see presented by MVD 102 for viewing at their viewing location VL-i. Updated content that is responsive to the viewing preference is displayed for viewing at a particular viewing location. In some embodiments, if the viewing preference cannot be satisfied with appropriate content, MVD system 101 selects a suitable substitute for the content. The displayed content can only be viewed at the particular viewing location; that is, a viewer in an adjacent viewing location will not be able to see it.

In the illustrative embodiment depicted in FIG. 1, MVD 102 appears above conventional movie screen 104. The placement of MVD 102 above screen 104 is to reduce the likelihood that a first viewer that is seated directly in front of a second viewer interferes with the image intended for a second viewer (See, e.g., FIG. 8B.). Since, in the illustrative embodiment, MVD 102 is intended to be used for captioning, it is relatively small compared to screen 104.

In theaters, captioning can be used for a variety of purposes. For the hearing impaired, captioning provides a way of understanding the audio track that cannot be heard. In addition to reproducing dialogue as text, captioning often includes descriptions of non-speech elements (e.g., a door opening, an explosion, etc.). Captions are commonly used for language translation, such as for a movie having dialogue in a language that viewers are not likely to understand (i.e., an Italian-language film shown in a U.S. movie theater, etc.). And, of course, captioning is used to present the dialogue for "silent" films. Although currently less common, captioning can also be used to provide commentary, such as the director's comments, critics' comments, character comments, actors' comments, etc. And there are many applications for captioning in environments other than theaters wherein individuals in a crowd are relatively stationary. For example, embodiments of the inventions can be used in conjunction with live performance theaters (e.g., opera, etc.), stadiums, houses of worship, lecture halls, theme parks, schools, and museums, among others.

FIG. 2 depicts a method by which viewers individually interact with MVD system 101 to view updated content. Task 201 of method 200 recites receiving viewer input, the viewer input being associated with one of a plurality of viewing locations, wherein the viewer input is independently selectable at each viewing location. In the illustrative embodiment, the viewer input is a viewing preference. In some embodiments, the input (e.g., viewing preference, etc.) is received, ultimately, at the system controller.

In the context of the illustrative embodiment, the viewer's input—viewing preference—is a particular viewer's preferences pertaining to captioning. For example, assume that a first viewer seated at a first viewing location wishes to view Italian-language subtitles during a movie. As such, the first viewer's viewing preference is "Italian-language subtitles." That viewing preference is "associated" with the first viewing location. That is, the system determines, by any of a number of instrumentalities and techniques, that the viewing preference that is received originates from or is otherwise intended to pertain to the first viewing location such that the updated content to be displayed is for viewing at the first viewing location. In some alternative embodiments, the viewing preference is "associated" with a viewer (rather than the first viewing location, per se), depending on the implementation and operation of the MVD system.

Assume that a second viewer, seated at a second viewing location, wishes to view a director's commentary track about the movie. Consequently, the second viewer's viewing preference is "Director's commentary." That viewing preference is "associated" with the second viewing location. In some alternative embodiments, the second viewer's viewing preference is "associated" with the second viewer, depending on the implementation and operation of the MVD system. In practice, an MVD in a theater system would be designed to resolve each individual seat, so that the content viewable at the first viewing location is not viewable at the second viewing location and vice versa. An MVD does, however, have a limited angular resolution, so if two people are seated such that they are leaning against one another, the system might not have sufficient resolution to keep the views to two such viewers distinct.

In the illustrative embodiment, MVD system 101 is capable of receiving viewer input (e.g., a viewing preference, etc.) for each viewing location VL-i, i=1,n in the theater. The viewing preferences of some viewers are likely to be the same as that of some other viewers, but there will also be viewing preferences that differ from one another. In any case, in the illustrative embodiment, the viewing preference associated with any particular viewing location is made without regard, and is not restricted by, viewing preferences associated with any other viewing locations. In some other embodiments, viewing preferences pertain to a designated group of viewing locations (e.g., a grouping of four view locations, etc.).

Task 202 of method 200 recites displaying, via an MVD, content that is based on the viewer input (viewing preference in the illustrative embodiment), wherein the content associated with a particular viewer input is viewable only at the viewing location associated with the particular viewer input. Of course, multiple viewers might provide the same viewer input to the system, such that associated content presented to those viewers will ultimately be the same.

Continuing with the example in which the first viewer's input or viewing preference is "Italian-language subtitles," the "content" is the Italian-language text corresponding to the movie's dialogue. In accordance with the illustrative embodiment, such content is viewable only at the first viewing location. The "content" that is associated with the second viewer's content selection ("Director's commentary") is the text of commentary provided by the Director pertaining to what appears on the MVD at any given point in the movie. Once again, the content (i.e., the text of the commentary) is viewable only at the second viewing location.

The process by which subtitles and captions are created, etc., is well known to those skilled in the art (see, e.g., "https://en.wikipedia.org/wiki/Subtitle_(captioning)") and is not described here so as to maintain the focus on elements that are germane to an understanding of the present invention.

To perform method 200, MVD system 101 must provide a way:

(1) for a viewer to communicate their input (e.g., viewing preference, etc.) on an individual basis to the system; and (2) to associate the viewer input (e.g., viewing preference, etc.) with a viewing location so that the content (responsive to the input) that is ultimately displayed is viewable by viewer at the proper viewing location.

Referring now to FIG. 3, MVD system 101 includes MVD 102, system controller 306, and one or more "input/locating" device(s). For clarity, conventional movie screen 104 is not depicted in FIG. 3.

Controller 306, which is depicted in FIG. 4 includes processor 440, processor-accessible storage 442, and transceiver 444.

Processor 440 is a general-purpose processor that is capable of, among other tasks, executing an operating system, executing device drivers, and executing specialized application software used in conjunction with the embodiments of the invention. Processor 440 is also capable of populating, updating, using, and managing data in processor-accessible data storage 442. In some alternative embodiments of the present invention, processor 440 is a special-purpose processor. It will be clear to those skilled in the art how to make and use processor 440.

Processor-accessible data storage 442 is non-volatile, non-transitory memory technology (e.g., RAM, ROM, EPROM, EEPROM, hard drive(s), flash drive(s) or other solid state memory technology, CD-ROM, DVD, etc.) that store, among any other information, data, device drivers (e.g., for controlling MVD 102, etc.), and specialized application software, which, when executed, enable processor 440 and MVD 102 to perform the methods disclosed herein. It will be clear to those skilled in the art how to make and use processor-accessible data storage 442.

Transceiver 444 enables one or two-way communications with input/locating devices and/or other devices and systems via any appropriate medium, including wireline and/or wireless, and via any appropriate protocol (e.g., Bluetooth, Wi-Fi, cellular, optical, ultrasound, etc.). The term "transceiver" is meant to include any communications means and, as appropriate, various supporting equipment, such as communications ports, antennas, etc. It will be clear to those skilled in the art, after reading this specification, how to make and use transceiver 444.

Although the illustrative embodiment depicts a single controller 306, in some embodiments, the functionality of controller 306 is distributed among several devices that might or might not properly be characterized as controllers. More particularly, the illustrative embodiments disclose that controller 306 executes specialized application software to determine viewing location and viewing preferences from viewer gestures. In some other embodiments, one or both of those functions are performed by other processors/computers. In such embodiments, controller 306 simply receives a command to cause the MVD to display a specific image to a specific viewing location. The operation of system controller 312 is discussed in further detail U.S. patent application Ser. No. 15/002,014 entitled "Method for Calibrating a Multi-view Display".

As used in this disclosure and the appended claims, the term "input/locating device(s)" means a device or devices that, at least in Part: (1) enables/facilitates communication between viewers and the MVD system and (2) provides "location information" to system controller 306 and/or other elements of system 101. As used in this disclosure and the appended claims, the term "location information" means information pertaining to the viewing location; more specifically, to the particular viewing location, of the many available, at which a particular item of output (i.e., the content responsive to the viewer input) is to be viewable.

In various embodiments, input/locating devices include, without limitation, the following:

- sensing system 308;
- sensing system 308 and optically sensed object 310;
- immovably installed interactive display 312;
- installed communications device 314;
- non-installed communications device 316;
- non-installed communications device 316 and non-active location tag 318 or active location tag 320;
- non-installed communications device 316 and shared location-determining system 328;
- viewer-provided communications device 322 with or without control app 324;
- viewer-provided communications device 322 with or without control app 324 and non-active location tag 318 or active location tag 320; and shared location-determining system 328 and non-installed communications device 316 or viewer-provided communications device 322 with or without control app 324.

It is to be understood that not all of input/locating devices are used in any one embodiment of an MVD system. The aforementioned devices and the manner in which they are used to enable communications and obtain/transmit location information are described below.

Input/locating device(s): Sensing System 308.

In some embodiments, MVD system 101 includes MVD 102, controller 306, and sensing system 308. In the illustrative embodiment, sensing system 308 is a camera that is proximal to MVD 102 and facing viewing locations VL-i. In some other embodiments, sensing system 308 comprises multiple cameras, or IR transmitter and receivers, or ultrasound transmitter and receivers, or a plurality of microphones, radar, lidar, RFID (wherein the viewer wears a wristband, etc., having an RFID tag), and the like.

Consider viewer V-1. Sensing system (e.g., camera, etc.) 308 can detect gestures made by viewer V-1 at her viewing location. Controller 306 can determine, via images obtained from the camera or other sensing system, the location of viewer V-1. This determination can be made based on the results of a previously performed calibration procedure. See applicant's co-pending patent application entitled "Calibrated Multi-View Display," previously referenced. Calibration enables controller 306 to identify viewing locations VL-i in the image provided by sensing system 308.

Figure 5:
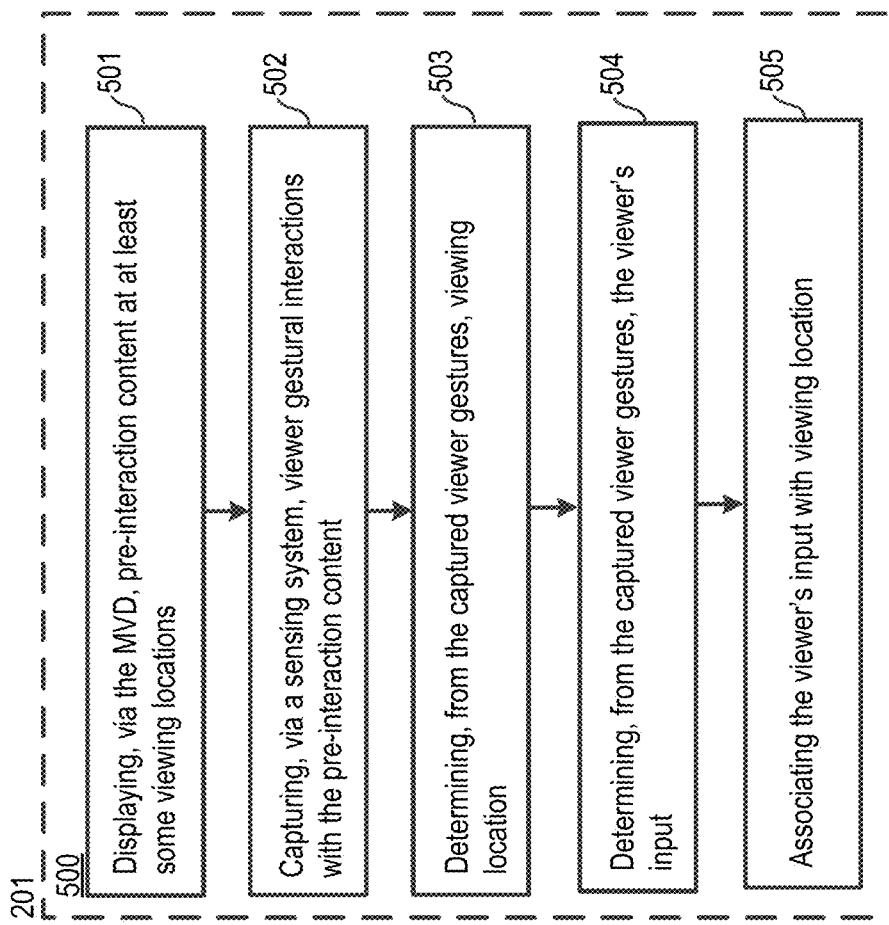
FIG. 5 depicts a first group of sub-tasks for use in conjunction with the method of FIG. 2.

The gestures captured by sensing system 308 can also serve as viewer input; that is, provide a viewing preference. Since, as discussed above, system controller 306 can determine viewer location, the viewing preference (as conveyed by gestures) can be associated with the appropriate viewing location VL-i. FIG. 5 depicts method 500 for implementing task 201 of method 200 for embodiments in which input/locating device is camera 308.

Referring now to FIG. 5, and with continuing reference to FIG. 3, sub-task 501 recites displaying, via the MVD, introductory information at at least some viewing locations. The introductory information can be, for example, a direction for the viewer to move a body part, such as one or both hands, or one or both arms, up or down, left or right, in circular fashion, etc. In embodiments that include presence-detection capability, introductory information is displayed at a viewing location only when a viewer is detected at that viewing location. In the absence of such capability, introductory information is displayed at all viewing locations.

Per sub-task 502, the viewer's gesture is captured by sensing system 308. The captured information is transmitted to controller 306, which determines at which viewing location VL-i the viewer is located according to sub-task 503.

Per the introductory information, viewer gestures can also be used to indicate viewing preference. For example, raising an arm might indicate that the viewer wishes to select language subtitling and lowering an arm might indicate that the viewer wishes to select commentary-related subtitling. Once a first gesture is decoded, in some embodiments, controller 306 will cause further viewing preference options to be displayed on MVD 102 for viewing at the viewer's location. For example, if the viewer raised her arm to select language subtitling, the system might respond by displaying (at the viewer's viewing location only) directions as to how to gesture to select from French, German, or Italian subtitles. Thus, in sub-task 504, the viewer's input (viewing preference in this embodiment) is determined from the captured gestures. Processor 440 in controller 306 executes specialized application software to determine viewing location and viewing preference from viewer gestures. Those skilled in the art will know how to code and use such specialized application software. In sub-task 505, controller 306 associates the viewing preference with the identified viewing location VL-i. This process is repeated for each viewer in theater 100.

Input/locating device(s): Sensing system 308 and Optically Sensed Object 310.

In some further embodiments, MVD system 101 includes MVD 102, controller 306, sensing system 308, and optically sensed object 310. In such embodiments, the sensing system includes optical sensing systems (e.g., cameras, etc.). The optically sensed object can be moved by viewer V-2 (see FIG. 3), in accordance with introductory information, to provide viewer input (e.g., specify viewing preference, etc.). It is used to ease vision processing, relative to tracking a viewer's hands or arms. This is accomplished via the use of a feature that is readily distinguishable from the background (other viewers, etc.). Examples of such a feature include, without limitation, the shape of object 310, its color, a pattern or symbols appearing on object 310, etc. In some further embodiments, the distinguishing characteristic can have a temporal component. For example, in some embodiments, the optically sensed object is an illuminated wand, which is manipulated by the viewer. The illumination is pulsed (i.e., the wand "flashes"), and pattern and/or the rate of pulsation conveying information (input/viewing preference) to the MVD system.

For embodiments that include optically sensed object 310, sub-tasks 501 through 505 can be used to accomplish task 201 of method 200.

In some embodiments, optically sensed object 310 is a relatively large (e.g., 12 inches×12 inches, etc.) planar surface. In some embodiments, the shape or surface of the surface is characterized by one or more of the aforementioned features, which can be used to indicate viewing preference as to content. In use, a viewer obtains, prior to reaching a viewing location, an appropriate optically sensed object 310 for conveying the viewer's viewing preference. Once at a viewing location, optical sensed object is raised such that camera 308 captures its image. Controller 306 determines location as previously discussed and determines viewing preference from the distinguishing feature(s) of optically sensed object 310, as captured by camera 308.

In some embodiments, MVD system 101 includes central server 330 in addition to camera 308 and optically sensed object 310. Central server 330 has access to a database which indicates viewing preferences of viewers that have previously registered with the system. In such an embodiment, optically sensed object 310 can be include information that identifies a viewer, such as a bar code that encodes an identification number, etc. Once at a viewing location, camera 308 captures the identifying information on object 310 and controller 306 determines location as previously discussed. The viewer's identifying information is transmitted to controller 306, which, in turn, transmits the identifying information over network 332 to central server 330. The central server accesses the viewer's records and transmits the viewer's viewing preferences pertaining to content, via network 332, to controller 306.

Input/locating device(s): Immovably installed interactive display 312.

In some additional embodiments, MVD system 101 includes MVD 102, controller 306, and interactive display 312. A viewer, such as viewer V-3, proceeds to interactive display 312, which is permanently (i.e., immovably)

installed at a location separate from the viewing locations. Interactive display 312 presents an interface (not depicted) at which the viewer enters a pre-assigned viewing location. For example, viewer V-3 keys in a viewing location (seat number), or scans a ticket that includes the viewing location, etc. The viewer also enters a viewing preference via the interface. Viewer V-3 would then proceed to the pre-assigned viewing location and, at the appropriate time, the requested content is viewable to the viewer V-3 at the viewing location.

Input/locating device(s): installed communications device 314.

In some embodiments, MVD system 101 includes MVD 102, controller 306, and installed communications device 314. The installed communications device is permanently installed at at least some of viewing locations VL-i. For example, in some embodiments, installed communications device 314 is a touch-screen controller that is mounted in front of a viewer's seat or on the seat's armrest, or buttons, etc., mounted in the seat's armrest, and the like.

The viewing location of each such installed communications device 314 is stored in controller 306. Alternatively, the viewing location can be communicated to controller 306 periodically or in conjunction with viewer communications, such as when viewer V-4 enters a content selection via an interface provided by installed communications device 314.

Figure 6:
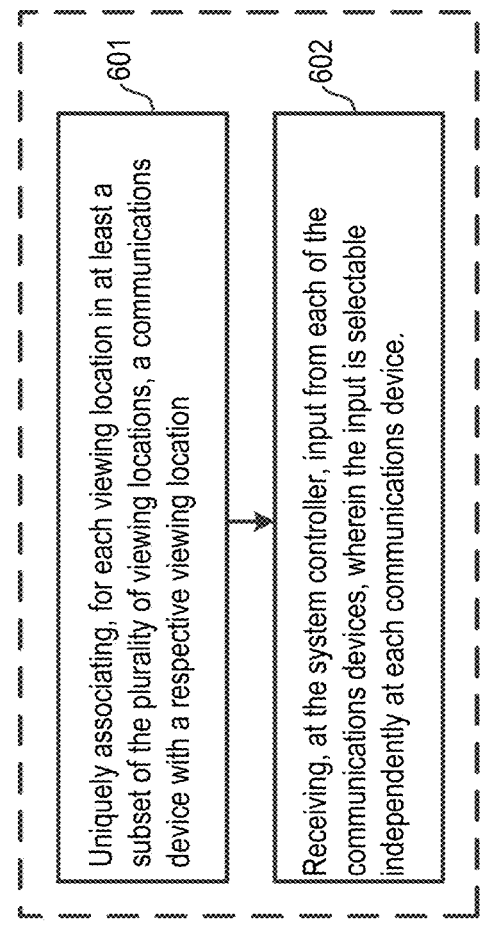
FIG. 6 depicts a second group of sub-tasks for use in conjunction with the method of FIG. 2.

FIG. 6 depicts method 600 for implementing task 201 of method 200 for embodiments in which input/locating device is installed communications device 314.

Sub-task 601 of method 600 recites uniquely associating, for each viewing location in at least a subset of the plurality of viewing locations, a communications device with a respective viewing location. As previously indicated, installed communications device 314 is permanently installed at near at least some of the viewing locations VL-i. Since it is permanently installed, communications device 314 can be readily associated with a particular viewing location, such as via the approaches indicated above or others as will occur to those skilled in the art.

Sub-task 602 recites receiving input (e.g., a viewing preference, etc.) from each of the communications devices, wherein each of the viewing preferences can be chosen independently of one another. Using an interface provided by installed communications device 314, a viewer inputs a viewing preference that is then transmitted to, for example, system controller 306.

Input/locating device(s): non-installed communications device 316.

In some embodiments, MVD system 101 includes MVD 102, controller 306, and non-installed communications device 316. In some embodiments, the non-installed communications device is distributed to viewers, such as viewer V-5. In some embodiments, device 316 is configured to work only at a designated viewing location (e.g., an electronic tag in a seat at the designated viewing location that enables device 316). In other embodiments, which is applicable to theaters in which seats are pre-assigned to viewers, non-installed communications device 316 is registered to the viewing location that corresponds to the viewer's pre-assigned seat. Thus, when device 316 communicates with controller 306, it transmits the viewing location along with, for example, the viewer's viewing preference.

Input/locating device(s): non-installed communications device 316 and passive location tag 318 or active location tag 320.

In some alternative embodiments, input/locating device(s) include passive tag 318 or active tag 320 as well as non-installed communications device 316. The passive tag, which is non-powered, provides a visual indication of seat number or the corresponding viewing location VL-i. Non-limiting examples of a passive tag include: a seat number visible on a portion of the seat located at a viewing location, a bar code or QR code (e.g., on a piece of material that is attached to the seat, etc.) and the like. The codes can be photographed by non-installed communications device 316 (or scanned, if device 316 is appropriately configured). The seat number can be photographed or manually input into device 316. Active tag 320 is a powered, short-range device that is able to transmit a viewing location to non-installed communications device 316 when the device is near to the active tag. An example of an active tag is a near-field communications (NFC) tag.

Input/locating device(s): viewer-provided communications device 322 with or without control application 324 and passive location tag 318 or active location tag 320.

In some embodiments, MVD system 101 includes MVD 102, controller 306, viewer-provided communications device 322 with or without control application 324 and passive location tag 318 or active location tag 320.

Viewer-provided communications device 322 can be any device (provided/owned by a viewer) that is a capable of communicating, either directly or indirectly, with controller 306 to transmit, at a minimum, a viewing preference. Data transmission modality/protocols can include, for example and without limitation, Wi-Fi, Bluetooth, smart-key technology, optical, ultrasound, and cellular. In the illustrative embodiment, communications device 322 is a smart phone; however, in alternative embodiments, communications device 322 is a tablet computer, a wearable computer, a game controller, computerized eyewear, or custom built devices.

In the illustrative embodiment, communications device 322 is capable of downloading, storing and executing application specific software; in particular, control application (app) 324. The app, which is effectively a part of MVD system 101 and is provided by the manufacturer/owner/operator of the MVD system 101, is downloaded from a website or obtained in any other convenient fashion. The app generates an interface for data entry (e.g., seat number/viewing location and viewing preference for the illustrative embodiment) and facilitates communication with controller 306.

In some alternative embodiments, viewer accesses a website, via communications device 322, which provides an interface for data (i.e., seat number/viewing location and viewing preference) entry. In embodiments in which communications device 322 has cellular communications capability, the viewer can communicate viewing location VL-i and viewing preference via a text to a pre-specified phone number. The texted information is then forwarded to MVD system 101 in known fashion.

Thus, a viewer, such as viewer V-6, obtains seat number/viewing location from passive tag 318 (via visual inspection/photography/scanning) or active tag 320 (via interrogation). Viewing preference is input via control app 324 or an interface accessed at a website. In the absence of an app or website-accessed interface (e.g., the viewing location and viewing preference, etc., is to be texted to MVD system 101), instructions pertaining to viewing preference are presented to viewer V-6 via a pamphlet, displayed on MVD 102 or movie screen 104 (FIG. 1), or in any other fashion.

Method 600 for implementing task 201 of method 200 can be used for embodiments in which input/locating device is viewer-provided communications device 322 and passive location tag 318 or active location tag 320.

Input/locating device(s): shared location-determining system 328 and non-installed communications device 316 or viewer-provided communications device 322.

In some embodiments, MVD system 101 includes MVD 102, controller 306, shared location-determining system 328 and non-installed communications device 316 or viewer-provided communications device 322 (with or without control app 324).

Shared location-determining system 328 provides a way to locate non-installed communications device 316 or viewer-provided communications device 322. The shared location-determining system 328 can be implemented via any one of variety of conventional technologies, such as localization techniques as applied to RF signals or acoustic signals, visual tracking, GPS, among others. Input (e.g., viewing preference, etc.) can be performed via any of the approaches previously disclosed.

Method 600 for implementing task 201 of method 200 can be used for embodiments in which input/locating device is shared location-determining system 328 and non-installed communications device 316 or viewer-provided communications device 322 (with or without control app 324).

Input/locating device(s): Non-installed communications device 316 or viewer-provided communications device 322.

In some embodiments, MVD system 101 includes MVD 102, controller 306, non-installed communications device 316 or viewer-provided communications device 322 (with or without control app 324).

In accordance with some embodiments, viewing location is determined utilizing MVD 102. As previously indicated, MVD 102 is capable of displaying a different image to each viewing location VL-i. This capability can be utilized to uniquely associate a viewer, such as viewer V-7 (FIG. 3) and/or communications devices 316 or 322 to a particular viewing location, as discussed further below.

Figure 7:
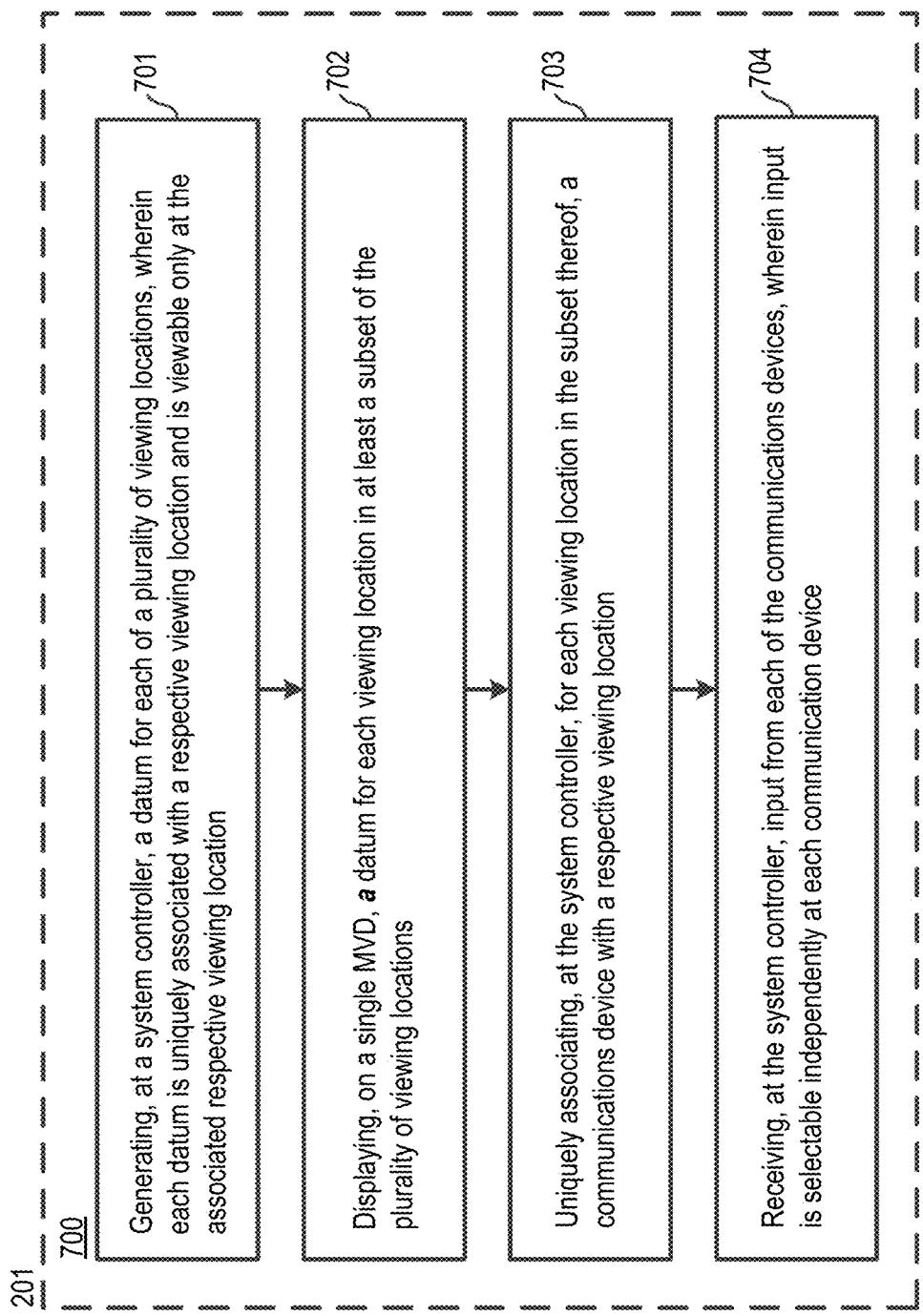
FIG. 7 depicts a third group of sub-tasks for use in conjunction with the method of FIG. 2.

The reader's attention is now directed to FIG. 7, which depicts method 700 for implementing task 201 of method 200 when a multi-view display, such as MVD 102, is used to facilitate an association between a viewing location VL-i and a viewer/portable device (e.g., non-installed communications device 316, viewer-provided communications device 322, etc.).

Sub-task 701 of method 700 recites generating a datum for each of a plurality of viewing locations, wherein information contained in each datum is uniquely associated with a respective one of the viewing locations and is viewable only at the one associated viewing location.

In this sub-task, element(s) of the MVD system, such as system controller 306, generates information, such as a plurality of symbols (e.g., a string of alphanumeric or other characters, etc.), which it uniquely associates with a viewing location. For example, controller 306 might generate characters 7023A!N52^ and designate them as being indicative of viewing location VL-004 and generate different characters and designate them as being indicative of viewing location VL-022. It is to be understood that the symbols need not be alphanumeric characters, nor does the information even need to be symbols; for example, a unique picture, or a bar code, or a QR code could be generated for each viewing location. In the illustrative embodiment, this process is repeated for all viewing locations and performed once (e.g., prior to first use of the multi-view display 102, etc.). In some embodiments, the generated characters and associated viewing location VL-i are stored in a look-up table.

Figure 8A:
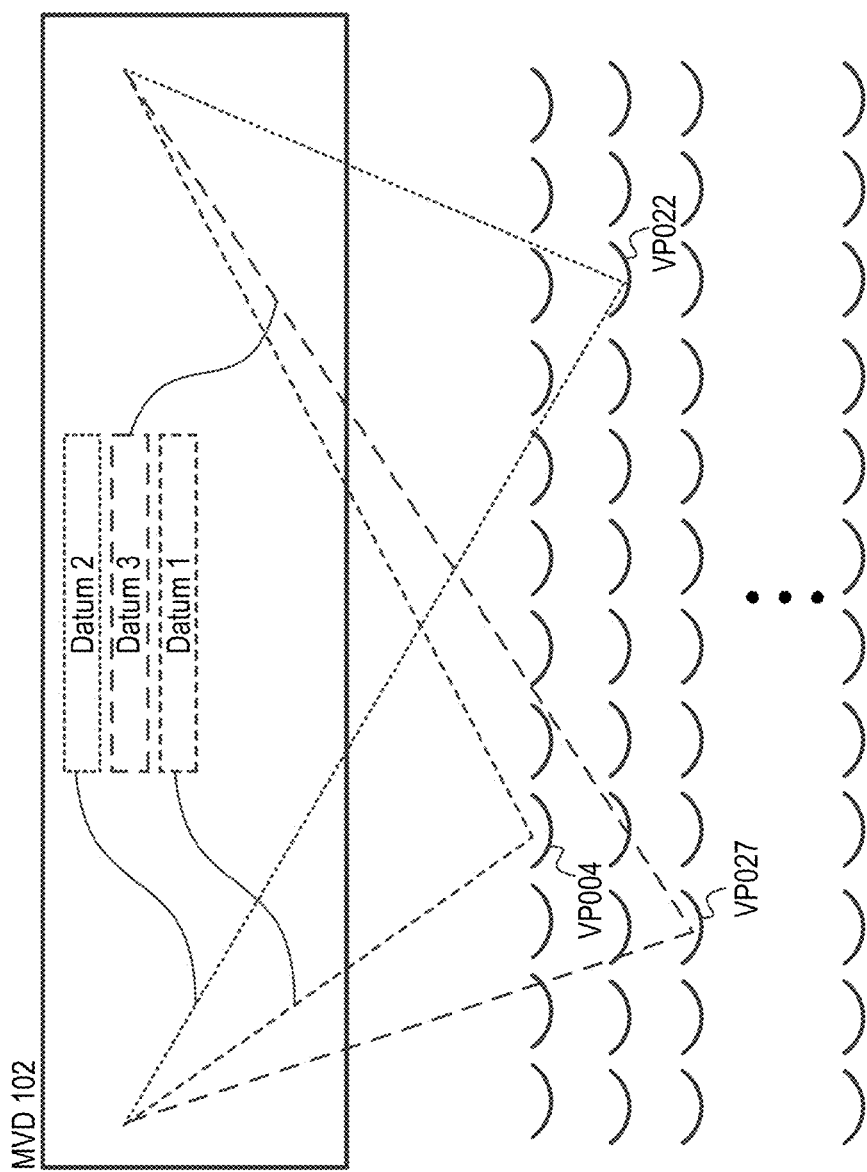
FIG. 8A depicts information being displayed on a multi-view display for use in creating an association between a viewing position and a communications device.
Figure 8B:
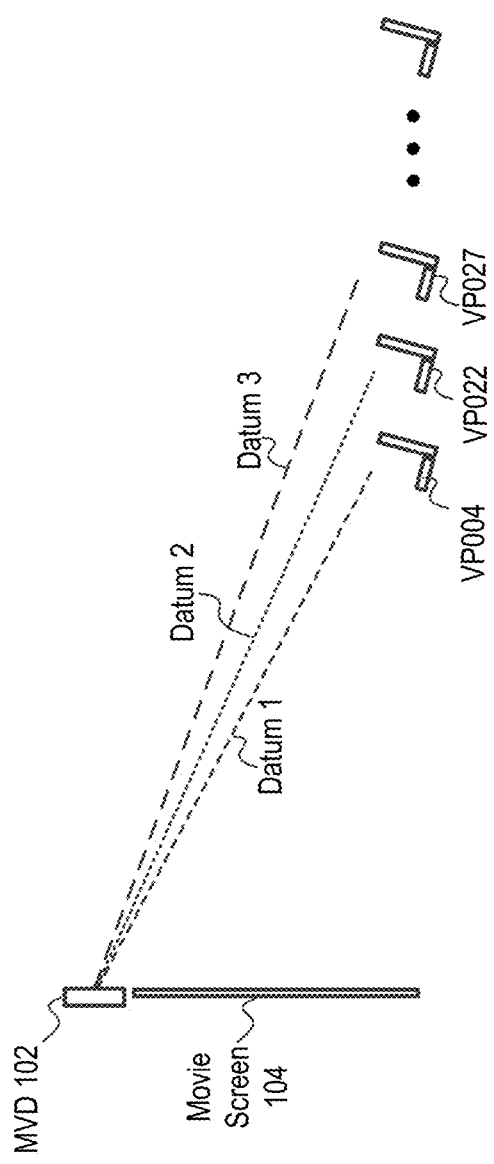
FIG. 8B depicts a side view of the arrangement shown in FIG. 8A.

In sub-task 702, the datums that are generated are displayed for viewing at at least some of the viewing locations, wherein the datum is viewable at the associated viewing location. Continuing with the example, controller 306 causes the datum 7023A!4N52^ to be viewable at viewing location VL-004 (but nowhere else). Other datums associated with other viewing locations VL-i are displayed for viewing at such locations. This is illustrated in FIGS. 8A and 8B, which show, via two different views, three different datums: datum 1, datum 2, and datum 3, being displayed for viewing at respective viewing locations VL-004, VL-022, and VL-027. Those datum have been associated with those particular viewing locations by operation of controller 306 in sub-task 701. It is notable that although the image of the plural datum are depicted as appearing above one another on MVD 102, they could appear in the same location on the MVD. The reason for this is that although the viewers that are located at those viewing locations are each viewing the same pixels, they are viewing them at different viewing angles. Furthermore, although it is not clear in FIG. 8A, it can be seen in FIG. 8B that the light being received by a viewer at viewing location VL-022 or by a viewer at viewing location VL-027 is not obscured by viewers seated at viewing locations closer to MVD 102.

Sub-task 703 recites uniquely associating, at the system controller, for at least some of the viewing locations, a communications device with a respective viewing location. This can be done by: (1) capturing the datum that is visible to a viewer on a communications device in the viewer's possession and (2) transmitting, from the communications device to the controller, the datum and a way to identify the communications device. The communications device can be, for example, non-installed communications device 316 or viewer-provided communication device 322.

With continuing reference to FIGS. 8A and 8B, the viewer at viewing location VL-004 sees Datum 1 on MVD 102. That datum is then captured in memory of the communications device in that viewer's possession. Likewise the viewer at viewing location VL-022 sees Datum 2 and the viewer at viewing location VL-027 sees Datum 3. And those datums are captured in memory of the respective communications devices in the possession of those viewers.

In some embodiments, if the communications device is viewer-provided communications device 322, control app 324 has been downloaded so that the datum can be entered. In some other embodiments, the viewer accesses a website that provides the interface for entry of the datum. In yet some further embodiments, the datum is texted from viewer-provided communications device 322 to a pre-specified phone number.

The datum can be manually entered (keying, touching, or voice) or by photographing it using the camera in a smart phone, etc. If the datum is in the form of a picture or a 1D or 2D barcode (the latter being a "QR code"), datum capture will typically be via a camera. (Unless the picture is readily reduced to text—such as if the pictures are, for example, images of animals or common objects. This addresses any likelihood of error issues when entering strings of alphanumeric characters.)

The communications device then transmits the datum to controller 306. This can be performed via short-range communications protocols (e.g., Bluetooth, Wi-Fi, etc.), via a data network, text, or other modalities or protocols.

Sub-task 704 recites receiving, at the system controller, input (e.g., a viewing preference, etc.) from the communications devices, wherein each viewing preference is independently selectable of others. This sub-task can be accomplished in a variety of ways. For example, after the datum is transmitted to controller 306, the controller can display viewing preference options at the appropriate viewing locations. Alternatively, the datum and content selection can be transmitted at the same time, as a function of the interface app. Other approaches for accomplishing sub-task 704, as will occur to those skilled in the art after reading the present disclosure, may suitably be used.

In accordance with sub-task 705, content is displayed to appropriate viewing location based on the input (e.g., viewing preference, etc.) and the aforementioned association between the communications device and the viewing location.

It is to be understood that the disclosure teaches just one example of the illustrative embodiment and that many variations of the invention can easily be devised by those skilled in the art after reading this disclosure and that the scope of the present invention is to be determined by the following claims.

What is claimed:

1. A method for operating a multi-view display, wherein the method comprises:
   receiving, at a system controller, input from each of a plurality of viewers, each viewer's input being associated with one viewing location of a plurality thereof, and wherein at least some viewers' input differ from other of the viewers' input; and
   displaying, via the multi-view display, content that is based on each viewer's input, wherein the content associated with any one viewer's input is viewable only at the viewing location associated with the one viewer's input.

2. The method of claim 1 and further wherein the input is conveyed to the system controller via an optically sensed object.

3. The method of claim 2 wherein a characteristic of the optically sensed object conveys the input.

4. The method of claim 3 wherein the characteristic is selected from the group consisting of color, shape, and pattern.

5. The method of claim 1 wherein receiving, at a system controller, input, further comprises:
   displaying, via the multi-view display, introductory information at at least some of the viewing locations, wherein the introductory information is viewed by viewers;
   capturing, via a sensing system, gestures of the viewers, wherein the gestures are based on the introductory information;
   determining, from the captured gestures, the viewing locations from which the gestures originated; and
   determining, from the captured gestures, the viewers' respective input.

6. The method of claim 5 wherein the introductory information directs the viewer to gesture.

7. The method of claim 5 wherein the gestures are made with a body part of the viewer.

8. The method of claim 1 wherein receiving, at a system controller, input, further comprises:
   uniquely associating, for each viewing location in at least a subset of the plurality of viewing locations, a communications device with a respective viewing location in said subset thereof; and
   receiving, at the system controller, input from each of the communications devices, wherein the input from at least some of the communications devices is different from the input from some other of the communications devices.

9. The method of claim 8 wherein the communications device is permanently located at each viewing location.

10. The method of claim 1 wherein receiving, at a system controller, input, further comprises:
    generating a datum for each of the plurality of viewing locations, wherein each datum is uniquely associated with a respective one of the viewing locations and is viewable only at the associated viewing location;
    displaying, on the multi-view display, the datum for at least some of the viewing locations;
    uniquely associating, for at least some of the viewing locations at which the datum appears, a communications device with a respective viewing location; and
    receiving input from each of the communications devices, wherein the input received from at least some of the communications devices is different from the input received from some other of the communications devices.

11. The method of claim 10 wherein the communications device is provided by the viewer.

12. The method of claim 10 wherein the communications device is provided to the viewer by an operator of the multi-view display.

13. The method of claim 1 wherein the input is a command that directs actions in a game, wherein game play is displayed by the multi-view display.

14. The method of claim 1 wherein the input relates to a viewer's interest in a product being advertised.

15. The method of claim 14 wherein the input is a viewer's movements with respect to the product.

16. A multi-view display system comprising:
    a multi-view display, wherein the multi-view display comprises one or more projection elements that emit light of a different color and brightness at different angles;
    a system controller that causes images to be displayed via the multi-view display, wherein the images are displayed simultaneously to a plurality of viewers located at a respective plurality of viewing locations, and further wherein at least some images displayed for viewing at some of the viewing locations are different from images displayed for viewing at some other of the viewing locations; and
    an input/locating device, wherein the input/locating device comprises:
    a camera that is proximate to the multi-view display and faces the plurality of viewing locations; and
    an optically sensed object, wherein the optically sensed object comprises characteristics that provide an indication of at least one of a viewing preference pertaining to presentation of content or an identity of a particular viewer.

17. The multi-view display system of claim 16, wherein the input/locating device is an interactive display at which a viewer can input a viewing location and viewing preferences pertaining to presentation of content, wherein the interactive display is immovably installed at a location other than any of the viewing locations.

18. The multi-view display system of claim 16 wherein the input/locating device is a communications device that is capable of transmitting at least one of a viewing location and a viewing preference pertaining to presentation of content.

19. The multi-view display system of claim 18 wherein the input/locating device further comprises at least one of either a passive location tag or an active location tag.

20. The multi-view display system of claim 18 wherein the input/locating device further comprises a shared location-determining system.

21. The multi-view display system of claim 18 further comprising a control application that is stored in the communications device, wherein the control application facilitates communications between the communications device and the system controller.

22. A method for operating a multi-view display, wherein the method comprises:
generating a datum for each of a plurality of viewing locations, wherein each datum for each of the viewing locations is different from one another and is therefore uniquely associated with the viewing location for which the datum is generated and is viewable only at the associated viewing location;
displaying, on the multi-view display, the datum for at least some of the viewing locations;
uniquely associating, for at least some of the viewing locations at which the datum appears, a communications device with a respective viewing location.

23. The method of claim 22 wherein each datum comprises a plurality of symbols.

24. The method of claim 22 wherein each datum is individually selected from the group consisting of a plurality of symbols, a picture, a bar code, and a QR code.

25. The method of claim 22 wherein uniquely associating a communications device with a respective viewing location further comprises:
capturing the datum that is visible to a viewer on a communications device in the viewer's possession; and
transmitting, from the communications device to a system controller, the datum and an indicia that identifies the communications device.

* * * * *